(12) United States Patent
Sanchez et al.

(10) Patent No.: US 9,586,529 B1
(45) Date of Patent: Mar. 7, 2017

(54) HEADREST HOOK HANGER

(71) Applicants: Roy C Sanchez, Las Vegas, NV (US); Marnel Estepa, Las Vegas, NV (US)

(72) Inventors: Roy C Sanchez, Las Vegas, NV (US); Marnel Estepa, Las Vegas, NV (US)

(*) Notice: Subject to any disclaimer, the term of this patent is extended or adjusted under 35 U.S.C. 154(b) by 0 days.

(21) Appl. No.: 14/980,378

(22) Filed: Dec. 28, 2015

(51) Int. Cl.
*B60R 7/10* (2006.01)
*B60R 7/04* (2006.01)
*B60N 2/48* (2006.01)
*B60N 2/44* (2006.01)

(52) U.S. Cl.
CPC ............ *B60R 7/043* (2013.01); *B60N 2/4876* (2013.01); *B60N 2002/4405* (2013.01); *B60R 7/10* (2013.01)

(58) Field of Classification Search
CPC ... B60R 7/043; B60R 7/10; B60R 2011/0017; B60R 2011/0059; B60R 2011/0071; B60N 2/4876; B60N 2002/4405
See application file for complete search history.

(56) References Cited

U.S. PATENT DOCUMENTS

| | | | | |
|---|---|---|---|---|
| 8,888,187 B2* | 11/2014 | Albino | ................ | B60N 2/4882 297/392 |
| 9,457,732 B2* | 10/2016 | Qian | ...................... | B60R 11/02 |
| 2010/0059463 A1* | 3/2010 | Sun | .......................... | B60R 7/10 211/85.3 |
| 2012/0006870 A1* | 1/2012 | Proctor | .................. | B60R 11/02 224/275 |
| 2013/0037672 A1* | 2/2013 | Sanchez | .................... | B60R 7/10 248/303 |
| 2013/0221712 A1* | 8/2013 | Sanchez | .............. | B60N 2/4838 297/188.03 |
| 2014/0015289 A1* | 1/2014 | Fan | ....................... | B60N 3/004 297/188.05 |
| 2014/0021230 A1* | 1/2014 | Sanchez | ................... | B60R 7/10 224/275 |
| 2016/0272121 A1* | 9/2016 | Nuako | .................... | B65B 67/00 |

* cited by examiner

*Primary Examiner* — Corey Skurdal

(57) ABSTRACT

A headrest hook hanger that clamps to a headrest rod with a hook is attach to a stand that holds upright a dual hook and the stand can rotate at any angle and the elongated clamp has a series of groves for the rod to fit into different position on the clamp and a latch at the end of the clamp holds the two sides of the clamp together and the handle locks the clamp down. The headrest hook hanger mounts to the side of a headrest inside a car, truck, and suv allows the drivers and passenger to hang their hats, caps, coat, and jacket along the side of the headrest.

10 Claims, 6 Drawing Sheets

HEADREST HOOK HANGER

BACKGROUND OF THE INVENTION

This invention is reference to publication number U.S. Pat. No. 8,777,073 B2 where Roy C. Sanchez created the first version of a headrest hook hanger that mounts to the side of the headrest. There were some issues with the first design for example the clamp did not have any grip around the rod and did not have a latch to wrap around the rod. The stand was not able to adjust in different angles and the hinge was prone to breaking with a heavy load. A better headrest hook hanger had to fix the issues from the first design and to be more universal and to adapt to all automobile headrest.

SUMMARY OF THE INVENTION

The advantage of the new headrest hanger apparatus is it has an elongated clamp with a latch and handle at the end of the swing clamp therefore when the swing clamp is close around a rod of the a headrest the latch clips to the outside of the elongated clamp and a handle locks down the clamp together. The next advantage is there is a rubber insert with series of grooves in between the clamp to add grip around the rod. The third advantage the stand can rotate 360 degrees at any angle so the hook can stay perpendicular to the floor even if the elongated clamp is mounted on a slanted rod. The other advantage is the hook has a detachable fastener that slide in and out of the stand to avoid injuries during a car accident. The last advantage is the stand folds in half during storage.

DETAILED DESCRIPTION OF THE PREFERRED EMBODIMENTS

Figure 1:
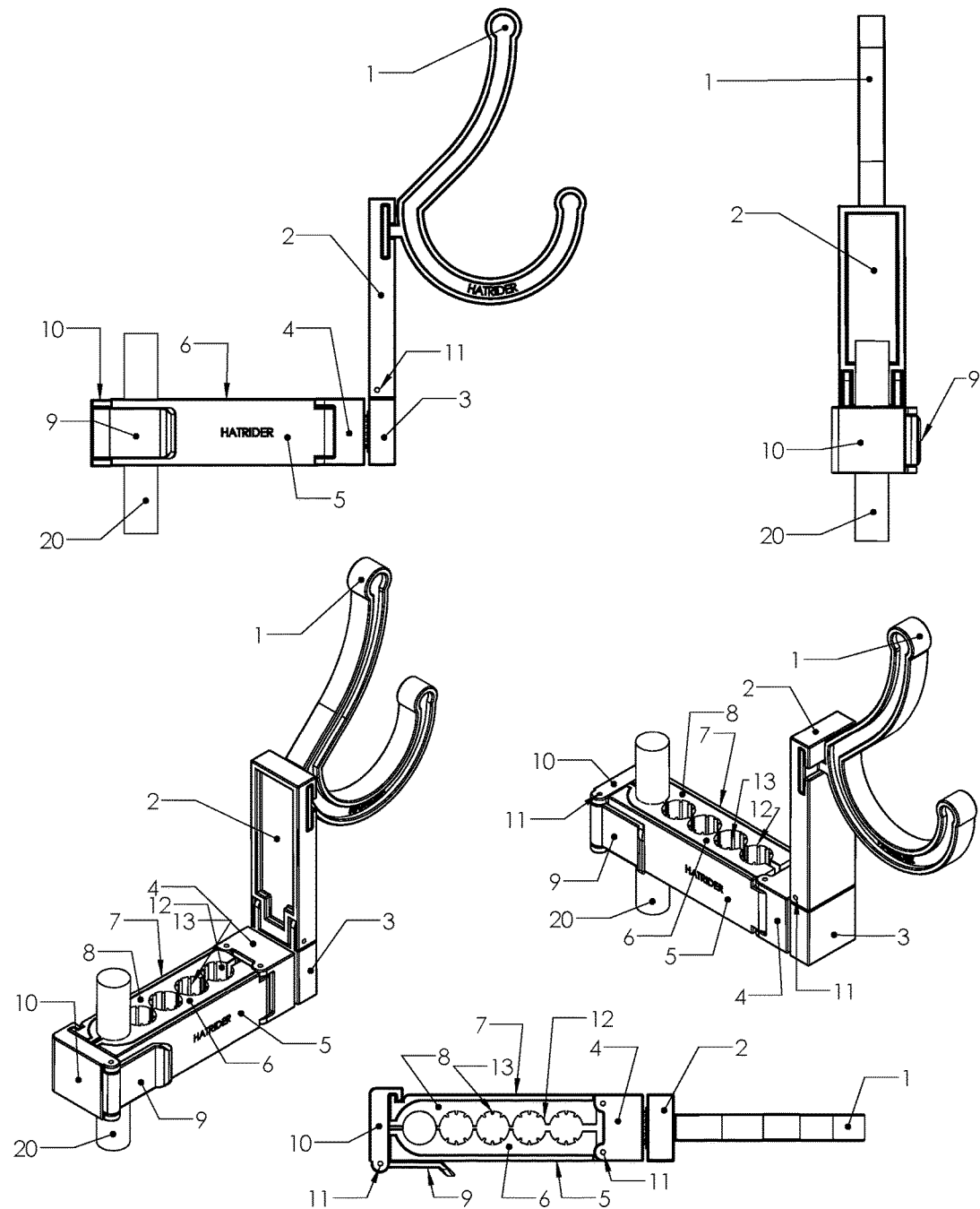
FIG. 1 is a diagram of the headrest hanger apparatus clamp down to a rod.

FIG. 1 is a diagram of the headrest hanger apparatus; a hook 1 is attach to a stand 2 which sits on top of a connector 3 is fasten to a base 4. A swing clamp 5 is attach to the base 4 and inside of the swing clamp 5 is a swing rubber 6 attach to the swing clamp 5. The opposite side is a stationary clamp 7 and a stationary rubber 8 combine together and is attach to the base 4. In between the swing rubber 6 and stationary rubber 8 is a rod 20. A latch 10 clips to the outer stationary clamp 7 and a handle 9 is pulled back to lock down the latch 10. There is a series of groove 12 along the swing rubber 6 and stationary rubber 8 that allows the rod 20 to be position at different length of the elongated clamp. Inside the series of groove 12 is a teeth 13 and the series of teeth 13 bites down around the rod 20 to provide grip.

Figure 2:
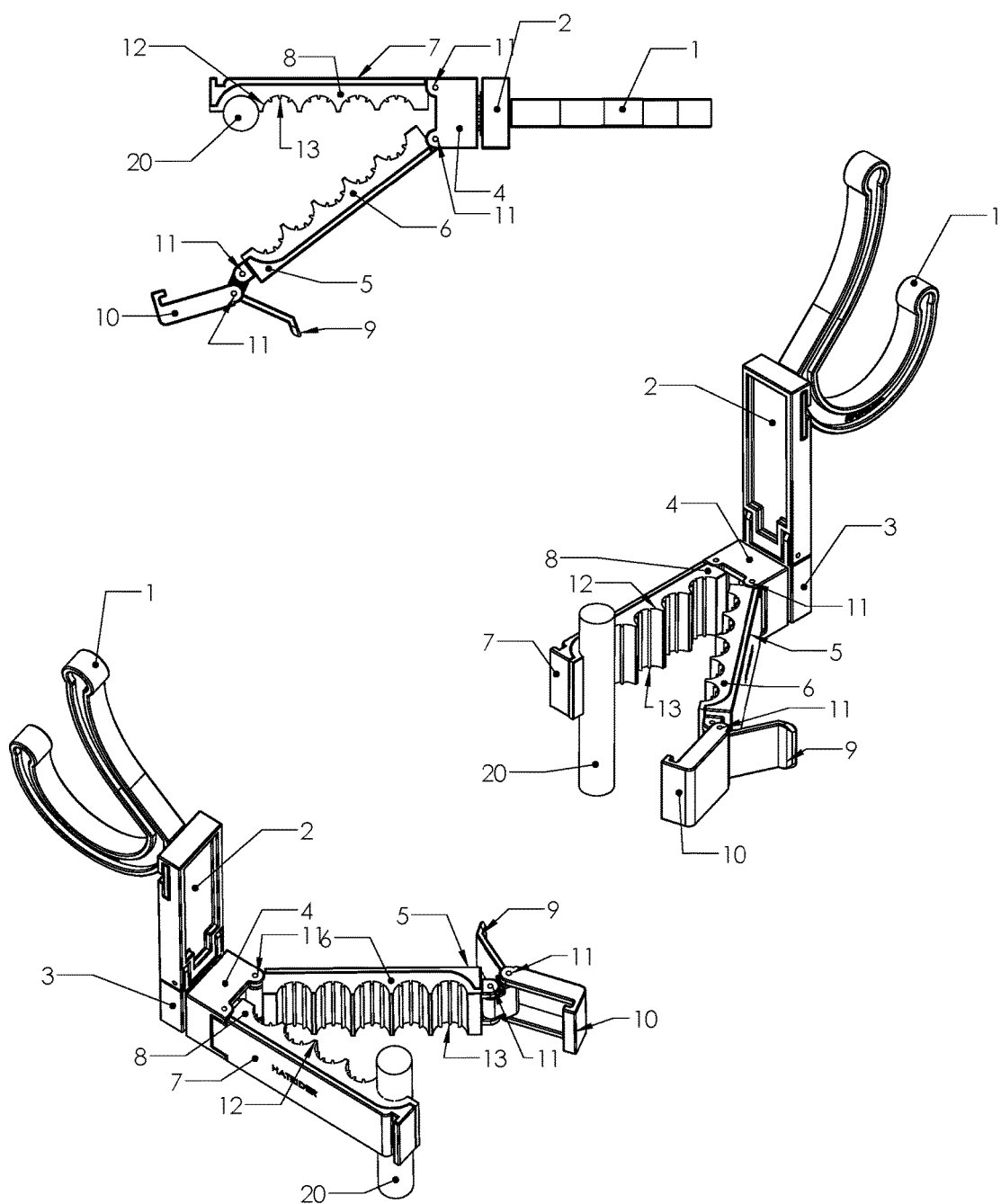
FIG. 2 is a diagram displays the swing clamp open and the latch open with the handle unlock.

FIG. 2 is a diagram displays the swing clamp 5 opens and with the handle 9 unlock and latch open 10. When the swing clamp 5 is open it can slide the rod 20 into any of the series of groove 12 long the stationary rubber 8 and swing rubber 6. The swing clamp 5 along with the swing rubber 6 will close together around the rod 20 and the series of teeth 13 inside the groove 12 bite down around the rod 20. The latch 10 is clip onto the outer stationary clamp 7 and the handle 9 is pulled back along the swing clamp 5 provides torque on the latch 10 and locks it down.

Figure 3:
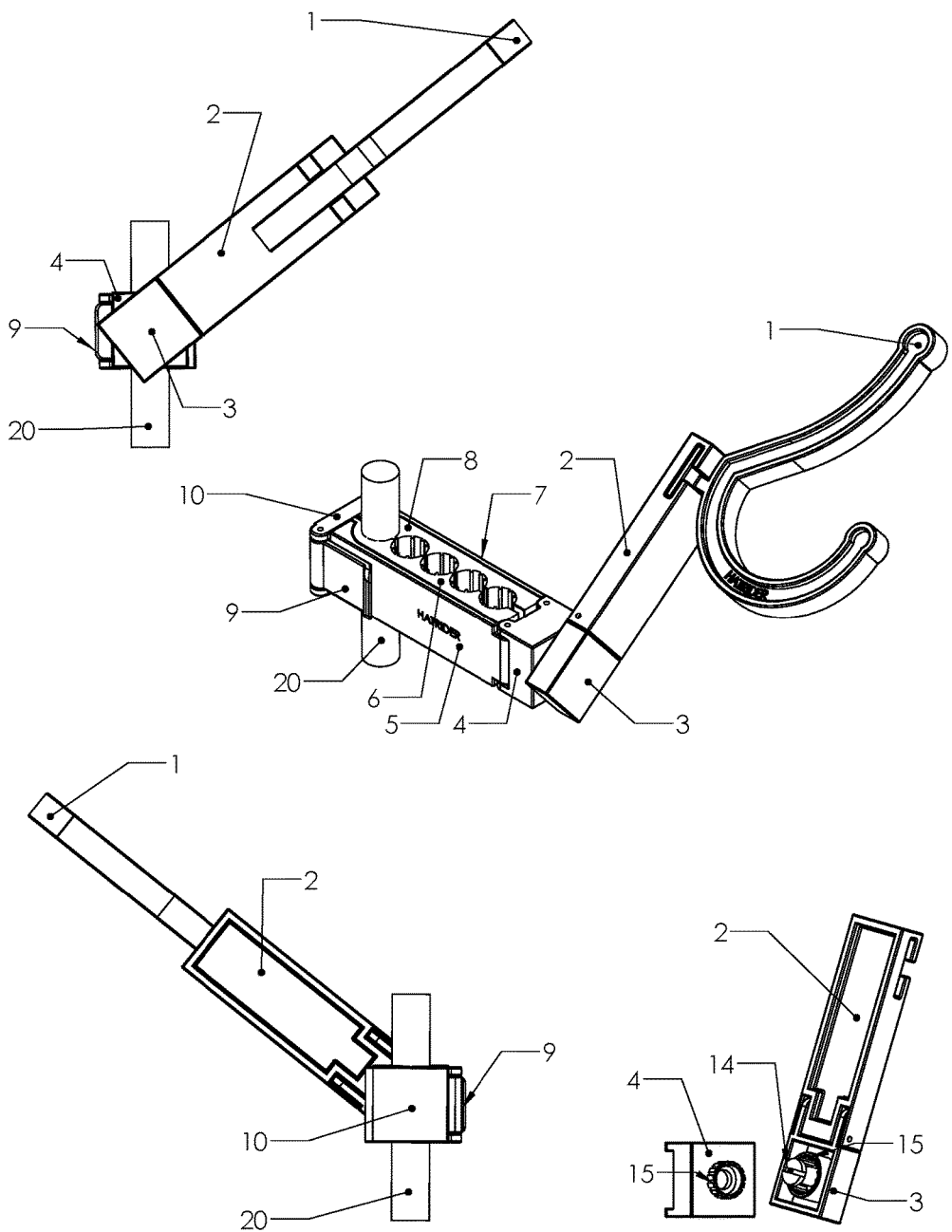
FIG. 3 is a diagram of the stand able to rotate at any angle.

FIG. 3 is a diagram of the stand 2 able to rotate at any angle. Inside the connector 3 and the base 4 is a fastener 14 that goes through a hole in the base 4 to fasten both the connector 3 and base 4. There is a cylinder gear 15 on the base 4 that extends with grooves 12 around a outer rim. The connector 3 has a matching cylinder gear 15 that has grooves 12 on the a inner rim and it joins together by over lapping the smaller cylinder gear 15 from the base 4 with the larger cylinder gear 15 from the connector 3 the opposite gears 15 have series of grooves that allow the stand 2 and connector 3 to turn rotate and stop at different angles with the cylinder gear 15 mechanism.

Figure 4:
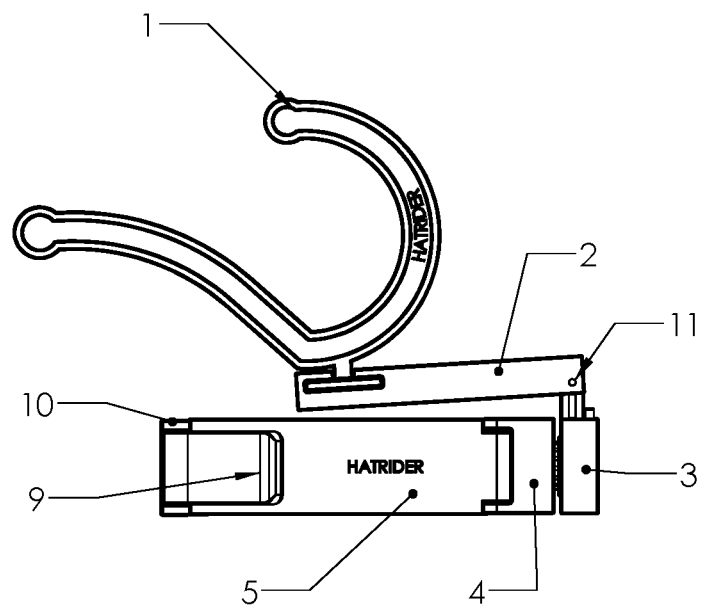
FIG. 4 is a diagram of the stand fold in half for storage.
Figure 4:
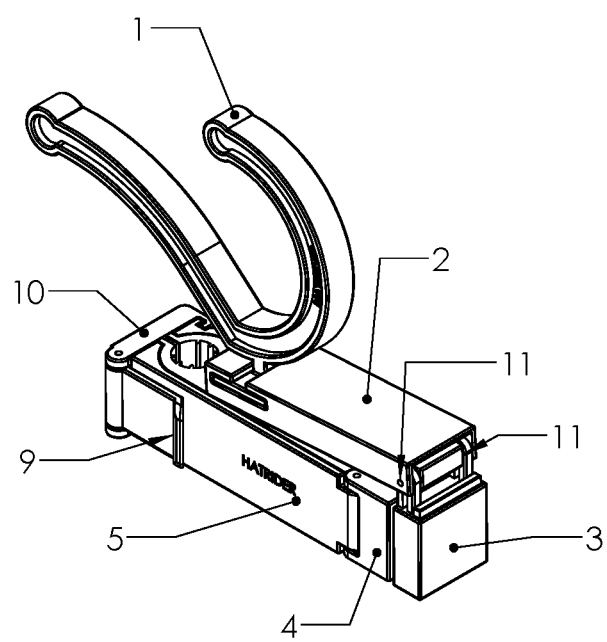

FIG. 4 is a diagram of the stand 2 fold in half. There is a hinge 11 on the bottom of the stand 2 and a hinge 11 on the top of the connector 3. The connector 3 hinge 11 allows the stand to slide out so it can fold in half during storage. When in use the stand 2 is lifted upright and then it slides down to the connector 3 top edge and locks into place.

Figure 5:
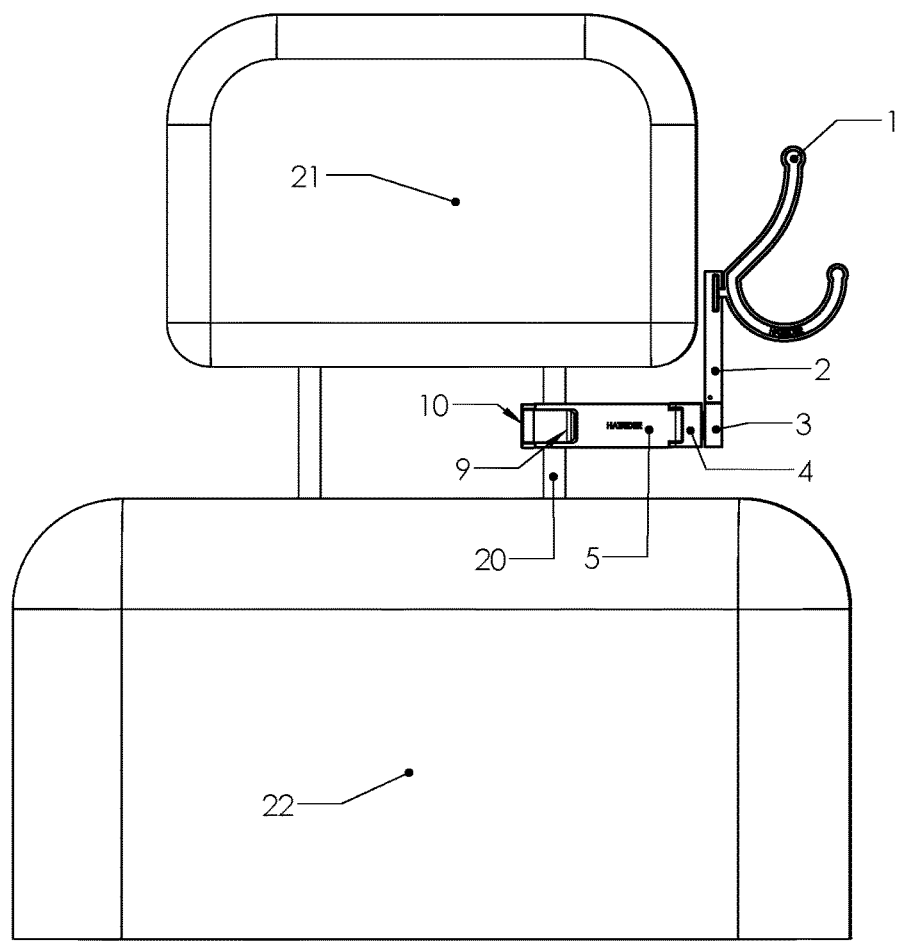
FIG. 5 is a diagram of the headrest hanger mounted to a headrest seat.
Figure 5:
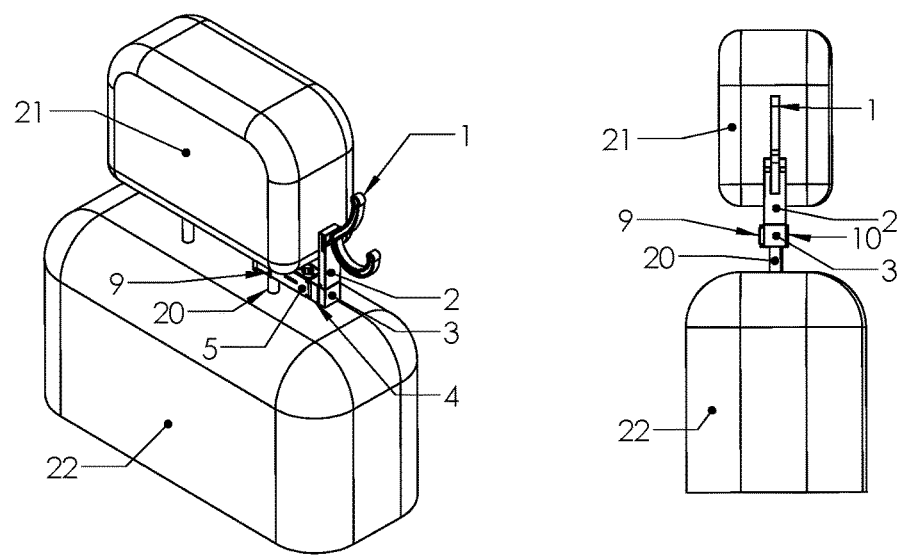

FIG. 5 is a diagram of the headrest hanger apparatus that is clamp to a rod 20 of a headrest 21. The headrest hanger is mounted to the side of the headrest 21 and the a dual hook 1 is protruding out on the side of the headrest 21. The stand 2 holds the dual hook 1 and the connector 3 connects to the base 4 and the swing clamp 5 is wrap around the rod 20 and the latch 10 is clip to the stationary clamp 7 and the handle 9 locks down the latch 10 and holds elongated clamp together along with the inside swing rubber 5 and stationary rubber 6 and the groove 12 and teeth 13 are providing grip around the rod 20. The elongated clamp is above the seat 22 and the stand 2 with the dual hook 1 is positioned parallel to the side of the headrest 21 and perpendicular to the elongated clamp to allow any user to hang items from the side of the headrest 21 and shoulder of the seat 22.

Figure 6:
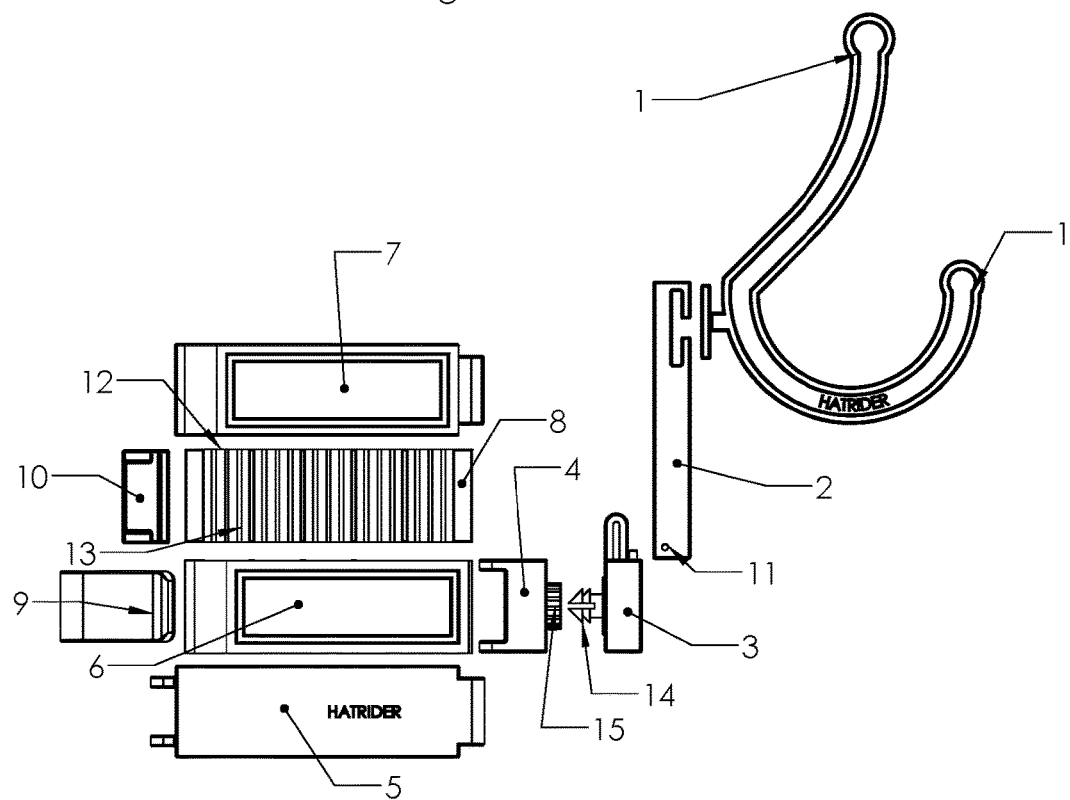
FIG. 6 is a exploded view of the headrest hanger and all the parts.
Figure 6:
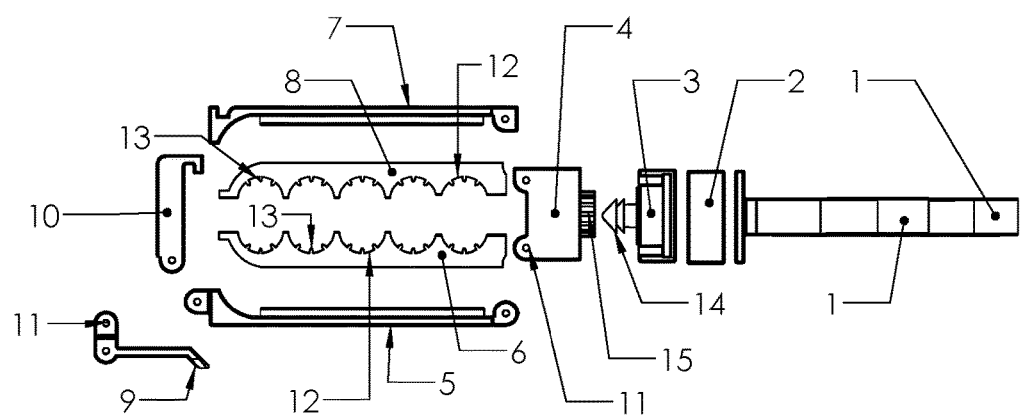

FIG. 6 is an exploded view of the headrest hanger apparatus and the parts of which is assembled together. The hook 1 is a detachable hook and on the top of the stand 2 has a socket opening where the hook 1 can slide into place. The detachable hook 1 adds safety it can slide out of the socket to avoid injury during a car accident and it also allows hook 1 to be interchangeable in different shapes and sizes. The stand 2 has a hinge 11 at the bottom that joins the connector 3 top hinge 11 to allow the stand to fold in half during storage and stand upright when in use. The connector 3 has a fastener 14 and a cylinder gear 15 and it fasten together the base 4 with a matching cylinder gear 15 a hole for the fastener 14 to fit through. The swing clamp 5 has a hinge 11 that connects to the base 4 hinge 11. The stationary clamp also has a hinge 11 that attach to the base 4 hinge 11. The swing rubber 6 has a pocket and the swing clamp 5 has a flange that insert into the pocket and joins them together. The same with the stationary rubber 8 has a pocket that allows the stationary clamp 7 with a flange to slide into the pocket and the two parts are attach. The end of the swing clamp 5 is a hinge 11 attach is the handle 9 that locks and unlocks the latch 10 around the stationary clamp 7.

The headrest hanger clamp can adapted to any latch 10 from a latch 10 on the corner to a ring latch that locks at different grooves and holds both sides of elongated clamp that adds torque to the outer clamp and pressure of the rubber insert provides tight grip around the rod. The dual hook 1 can be made from rubber or any soft thermo plastic material to prevent any injuries. The long reach of the elongated clamp can extend out holding the vertical stand further away from the headrest and the headrest hanger can vary in different types of clamp and bracket holding multiple hooks allow users to hang hats, cap, coats, jackets from side of the headrest and should of the seat inside an automobile.

The invention claimed is:

1. A headrest hanger apparatus comprising:
    an elongated clamp having first and second opposite sides; a stand; a hook; a base; a connector;
    wherein the hook is attached to the stand, the stand is attached to the connector, the connector is attached to the base, the elongated clamp is attached to the base;
    wherein the elongated clamp mounts to a rod of a vehicle headrest and the hook allows the user to hang objects thereon;
    wherein the elongated clamp further comprises a swing clamp on the first side, a swing rubber, a stationary clamp on the second side, a stationary rubber, a latch, wherein the latch locks the first and second opposite sides of the elongated clamp together, and a handle attached to the latch;
    wherein the swing rubber is attached to the swing clamp and the stationary rubber is attached to the stationary clamp and a series of grooves are formed in different positions along a length of the stationary rubber and of the swing rubber to enable the rod to be placed at different positions along the elongated clamp;
    wherein a series of teeth are formed within each groove that bite down on the rod when the elongated clamp is closed to provide grip on the rod;
    and wherein the swing clamp is attached to the base by a hinge that allows the user to open a mouth between the two sides of the elongated clamp so the rod can be inserted into the grooves and the swing clamp and stationary clamp can be closed together and be secured together by the latch.

2. The headrest hanger apparatus of claim 1, wherein the latch and handle are attached at a distal end of the swing clamp, wherein the handle opens and closes the elongated clamp, wherein the latch clips on to an outer side of stationary clamp and the handle is pulled back to lock down the latch to keep the elongated clamp around the rod; wherein the latch is one of a solid latch or a ring latch that can clip onto the stationary clamp to secure the rod in different positions within the elongated clamp.

3. The headrest hanger apparatus of claim 1, wherein the stand comprises: a top and a bottom, a slot formed on the top of the stand and wherein the hook is removably inserted within the slot to hold the hook on the top of the stand, and wherein the slot allows the hook to slide out during a car accident to avoid any injuries; and wherein the stand has a hinge at the bottom that allows the stand to fold down along the elongated clamp.

4. The headrest hanger apparatus of claim 3, wherein the hook comprises a dual hook with a detachable fastener that slides into the slot of the stand; wherein the dual hook is interchangeable and can slide in and out of the slot in case of an accident; and wherein the hook is made from a rubber or a soft thermoplastic material that allows the hook to collapse and bounce back to its original shape.

5. The headrest hanger apparatus of claim 1, wherein the connector comprises: a fastener; a cylinder gear; a plurality of grooves on an inner rim of the cylinder gear and the fastener has a flange, wherein the connector is connected to the base through a hole in the base, the flange locking the connector and base together; a top of the connector has a long hinge connected to the stand that allows the stand to fold down over the elongated clamp and slide on top of the connector to stand upright; the cylinder gear formed to cap around an opposite cylinder gear of the base; wherein a turn gear mechanism allows the connector and stand to rotate 360 degrees so the stand can stay perpendicular to a floor of the vehicle when the elongated clamp is secured to the rod and the rod is slanted with respect to the vehicle floor.

6. The headrest hanger apparatus of claim 5, wherein the base comprises: a hinge; a hole; a cylinder gear; a plurality of grooves on an outer rim of the cylinder gear, wherein the outer rim connects with inner rim of the cylinder gear of the connector and the fastener is insert into the hole of the base such that the base and connector are joined together and the cylinder gears form the turn gear mechanism to rotate the connector and stand to any angle when attached to the base; and wherein the swing clamp of the elongated clamp is attached to the hinge of the base and the hinge of the base allows the swing clamp to open and close with respect to the base.

7. The headrest hanger apparatus of claim 1, wherein the stand comprises a top and a bottom, wherein the hook is on the top of the stand.

8. The headrest hanger apparatus of claim 7, wherein the hook comprises a dual hook and wherein the hook is made from a rubber or a soft thermoplastic material that allows the hook to collapse and bounce back to its original shape.

9. The headrest hanger apparatus of claim 1, wherein the stand and the base are attached together so the stand can stay perpendicular to a floor of the vehicle when the elongated clamp is secured to the rod.

10. The headrest hanger apparatus of claim 9, wherein the base comprises: a hinge; and wherein the swing clamp of the elongated clamp is attached to the hinge of the base and the hinge of the base allows the swing clamp to open and close with respect to the base.

* * * * *